United States Patent
Norton et al.

(10) Patent No.: US 11,334,368 B2
(45) Date of Patent: May 17, 2022

(54) PROCESS AND THREAD LAUNCH FEATURES

(71) Applicant: HEWLETT PACKARD ENTERPRISE DEVELOPMENT LP, Houston, TX (US)

(72) Inventors: Scott J. Norton, Palo Alto, CA (US); Thomas L. Vaden, Bridgewater, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 322 days.

(21) Appl. No.: 15/756,218

(22) PCT Filed: Sep. 24, 2015

(86) PCT No.: PCT/US2015/051986
§ 371 (c)(1),
(2) Date: Feb. 28, 2018

(87) PCT Pub. No.: WO2017/052555
PCT Pub. Date: Mar. 30, 2017

(65) Prior Publication Data
US 2018/0253315 A1  Sep. 6, 2018

(51) Int. Cl.
*G06F 9/445* (2018.01)
*G06F 9/48* (2006.01)
(Continued)

(52) U.S. Cl.
CPC ............ *G06F 9/445* (2013.01); *G06F 9/4881* (2013.01); *G06F 9/5027* (2013.01);
(Continued)

(58) Field of Classification Search
None
See application file for complete search history.

(56) References Cited

U.S. PATENT DOCUMENTS 6,282,703 B1 *  8/2001  Meth ..................... G06F 8/54
                                                   717/163
6,529,985 B1 *  3/2003  Deianov ................ G06F 9/54
                                                   710/260
(Continued)

FOREIGN PATENT DOCUMENTS

CN        1298147 A     6/2001
CN      102855138 A     1/2013
(Continued)

OTHER PUBLICATIONS

International Search Report & Written Opinion received in PCT Application No. PCT/US2015/051986, dated Jun. 20, 2016, 10 pages.
(Continued)

*Primary Examiner* — Philip Wang
(74) *Attorney, Agent, or Firm* — Hewlett Packard Enterprise Patent Department (57) ABSTRACT

A system for providing features at launch to an application. The system may execute a user-space launcher application. To execute the launcher application, the computing system may: wrap a process creation function with a process creation wrapper function, preload a function library comprising the process creation function, launch an application specified to the launcher application, intercept a call to the process creation function of the launched application with the process creation wrapper function, create a process on behalf of the launched application using the process creation function, and provide a feature at launch to the process of the launched application based on a parameter specified to the launcher.

21 Claims, 5 Drawing Sheets

(51) Int. Cl.
*G06F 9/50* (2006.01)
*G06F 9/54* (2006.01)

(52) U.S. Cl.
CPC .......... *G06F 9/5033* (2013.01); *G06F 9/5066* (2013.01); *G06F 9/545* (2013.01); *G06F 2209/502* (2013.01)

(56) References Cited

U.S. PATENT DOCUMENTS

| | | | | |
|---|---|---|---|---|
| 7,831,325 | B1* | 11/2010 | Zhang | G06F 11/3409 700/108 |
| 8,122,451 | B2 | 2/2012 | McDonald | |
| 8,239,488 | B2* | 8/2012 | Firminger | G06Q 10/10 706/11 |
| 8,539,488 | B1* | 9/2013 | Havemose | G06F 11/1469 718/100 |
| 8,966,491 | B2 | 2/2015 | Calciu et al. | |
| 9,003,082 | B2 | 4/2015 | Okada et al. | |
| 2002/0055965 | A1* | 5/2002 | Kanamori | G06F 9/449 718/107 |
| 2004/0059706 | A1* | 3/2004 | Abelite | G06F 16/10 |
| 2004/0138847 | A1 | 7/2004 | Lebee et al. | |
| 2006/0206489 | A1 | 9/2006 | Finnie et al. | |
| 2008/0172668 | A1* | 7/2008 | Tzruya | G06F 9/5088 718/101 |
| 2008/0244578 | A1* | 10/2008 | Yoav | G06F 9/485 718/100 |
| 2009/0019159 | A1* | 1/2009 | Ma | G06F 9/5055 709/226 |
| 2009/0293073 | A1* | 11/2009 | Nathan | G06F 9/547 719/328 |
| 2014/0208331 | A1* | 7/2014 | Li | G06F 9/5044 718/105 |
| 2014/0237197 | A1* | 8/2014 | Gray | G06F 3/061 711/153 |
| 2014/0237477 | A1 | 8/2014 | Cadambi et al. | |
| 2015/0277867 | A1* | 10/2015 | Hasabnis | G06F 9/44521 717/164 |
| 2015/0332043 | A1* | 11/2015 | Russello | G06F 11/30 726/23 |
| 2016/0077850 | A1* | 3/2016 | Andrus | G06F 9/4552 717/139 |
| 2016/0246594 | A1* | 8/2016 | Shoavi | G06F 8/65 |
| 2018/0253315 | A1 | 9/2018 | Norton et al. | |

FOREIGN PATENT DOCUMENTS

| | | |
|---|---|---|
| CN | 104239089 A | 12/2014 |
| CN | 104380256 A | 2/2015 |
| CN | 104881291 A | 9/2015 |
| EP | 2782038 A1 | 9/2014 |
| EP | 3332321 A4 | 3/2019 |
| WO | WO-2007115429 | 10/2007 |
| WO | 2017/052555 A1 | 3/2017 |

OTHER PUBLICATIONS

Lameter, C., "NUMA (Non-Uniform Memory Access): An Overview," Aug. 9, 2013, 19 pages, https://queue.acm.org/detail.cfm?id=2513149&ref=qnh.

Brustoloni, J. et al. "Quality of Service Support for Legacy Applications," Jun. 25, 1999, http://www1.cs.columbia.edu/~hgs/nossdav/1999/papers/41-1220645335.pdf.

* cited by examiner

PROCESS AND THREAD LAUNCH FEATURES

BACKGROUND

A computing system may have an operating system that manages resources and application execution. The operating system may create processes and/or threads on behalf of an executing application. A process is an instance of a computer program that is being executed. Each process may comprise a thread. Each thread of a process may share an address space. In systems with multiple logical cores, different cores may execute the process and/or threads.

BRIEF DESCRIPTION OF THE DRAWINGS

The following detailed description references the drawings, wherein.

DETAILED DESCRIPTION

An operating system is a computer program that executes on a computing system. The operating system is responsible for handling the allocation of resources of a computing system and managing application execution. As an example of managing application execution, an operating system may spawn processes and threads responsive to receiving system calls, i.e. requests for operating system functionality, from an application.

A process is an instance of an application a computing system is executing. Processes may further comprise threads in various examples. Each thread of a process may share an address space, whereas processes may not share the same address space. In systems with multiple logical cores, different processors may execute the processor and/or threads. The operating system may assign the processes and/or threads to the different cores within the computing system.

Computing systems continue to include increasing numbers of logical cores. However, the latency between these logical cores within a computing system may not be uniform, which poses issues for application execution. As an example, a number of logical cores may be integrated within a single physical die e.g., a single central processing unit (CPU). Cores within a single CPU may share data with each other using the cache hierarchy within the CPU. Multiple CPUs may be integrated within a motherboard. However, the latency for processes or threads to communicate between different CPUs integrated within the same motherboard may be generally much greater than the latency associated with threads or processes communicating within a single physical CPU.

Computing systems such as blade servers may include blades of CPUs. Each blade is itself a server comprising one or more CPUs. Each of the blades may be connected to the other blades in the blade server via a backplane. The latency for processes or threads to communicate with each other between cores located on different mainboards or blades is greater than the latency associated with threads or processes communicating within a single physical CPU. The different latencies associated with communicating between the different cores poses challenges for application execution and operating system resource allocation.

The operating system may assign processes and threads of an application to the logical cores of the computing system. However, the operating system may not have information related to the underlying system architecture. For example, an operating system may not have, and/or may not make use of information related to whether two logical cores are located on the same chip or mainboard or the latency impact of assigning processes and/or threads to the two different logical cores.

In some cases, the operating system may launch processes and/or threads on different cores in a pattern that may be inferior to other patterns, and thus hurt application performance. For example, the operating system may assign two processes or threads to different cores when the threads or processes would perform better if they were assigned to the same logical core.

The techniques of this disclosure describe a user-space launcher application that provides features at launch to a launched application that is specified to the launch application. By providing features at launch to the launched application, the launcher application may improve application performance and/or provide more control over application execution behavior.

Upon execution, the launcher application sets an environment variable that causes the dynamic loader of an operating system to preload a function library when a launched application starts executing. The function library comprises a thread creation wrapper function and a process creation wrapper function. The launcher application launches the application specified to the launcher application, referred to herein as the launched application. The function library intercepts process and/or thread creation function calls using the thread creation wrapper functions and/or process creation wrapper function.

The function library then provides features at launch to the processes or threads of the application based on at least one parameter specified to the launcher. Example launch features may comprise launch policy options and launch policy types) related to assigning the processes and/or threads to nodes (e.g., CPUs in a physical socket), and/or logical cores of a computing system. The features may further include memory allocation, CPU affinity (e.g., a logical CPU affinity), CPU assignment, input-output (IO) affinity, kernel scheduling policies, and the like.

Figure 1:
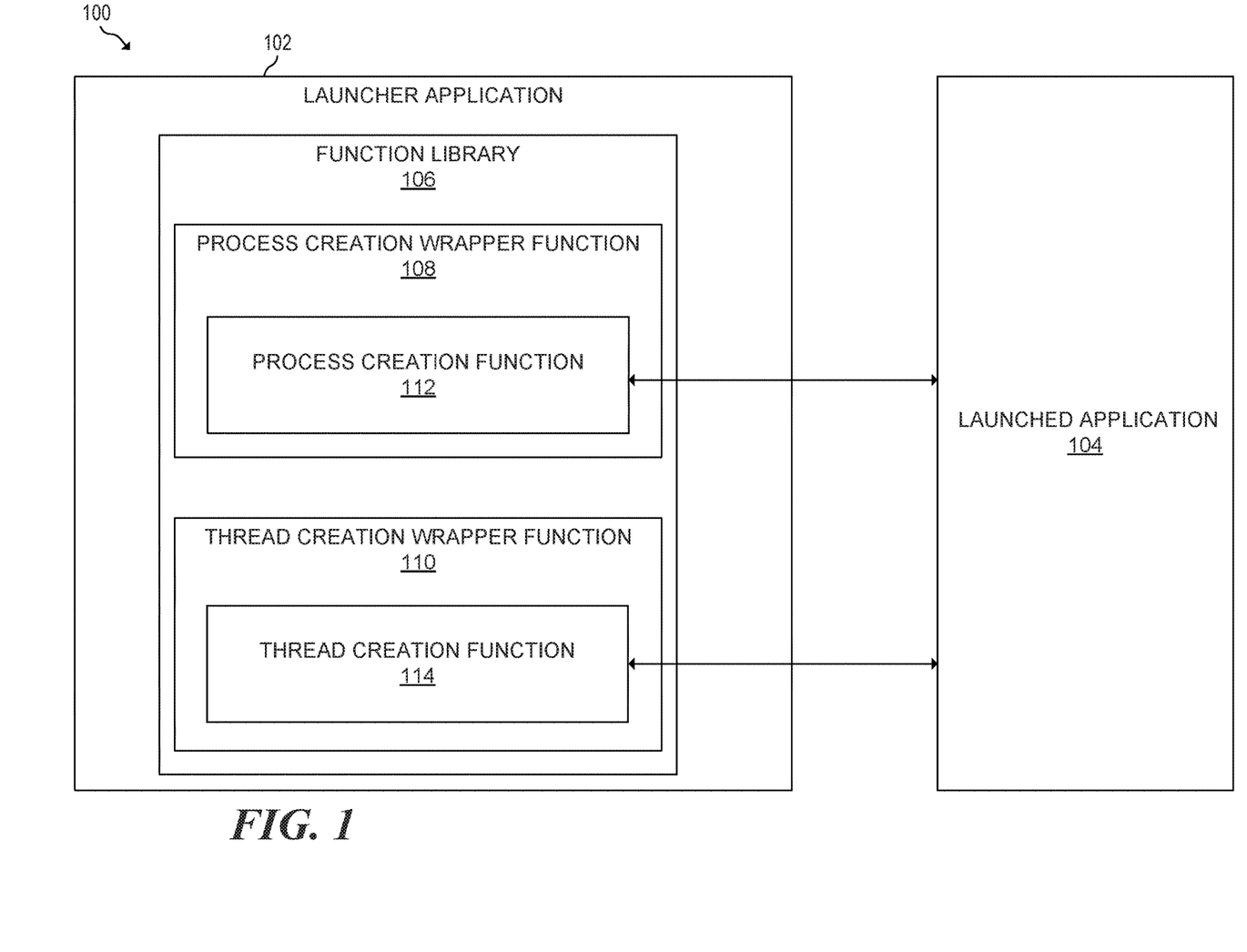
FIG. 1 is a block diagram illustrating an example of a computing system for providing features at launch.

FIG. 1 is an example of a computing system for providing features at launch to an application. FIG. 1 illustrates a system 100 that includes a launcher application 102, function library 106, launched application 104, process creation wrapper function 108, thread creation wrapper function 110, process creation function 112, and thread creation function 114.

In the example of FIG. 1, system 100 may comprise a number of logical cores, any combination of which may execute an operating system. The operating system may execute a kernel that manages IO, application system calls, performs process scheduling, and manages other resources of the computing system. The kernel may be loaded into a protected area of memory, which prevents the kernel from being overwritten and provides other safety mechanisms. The operating system may execute applications, such as launcher application 102, in user space. User space is a separate virtual memory area from the kernel, and protects operating system and the kernel from malicious or undesirable software behavior.

By executing launcher application 102 in user space, modifying the kernel can be avoided. Additionally, a user or program may provide indications, such as command-line arguments user inputs or the like, that cause launcher application 102 to provide features to launched application 104 at run-time. In this manner, a user or another application may affect the execution behavior of launched application 104.

Launcher application 102 may comprise a command-line application in various examples. Launcher application 102 may be a graphical user interface (GUI) application in other examples. Upon execution, launcher application 102 may set a preload environment variable, such as the LD_PRELOAD environment variable available to Linux and Unix systems, or the like. Launcher application 102 may use different environment variables or techniques to preload function library 106 in other examples. Responsive to setting the preload environment variable, the operating system loads the functions of that shared object set in the environment variable before any other shared objects when a process of launched application 104 begins execution.

Launcher application 102 sets LD_PRELOAD to function library 106. Function library 106 includes process creation wrapper function 108, and thread creation wrapper function 110. Process creation wrapper function 108 is illustrated as a single function for the purposes of example, but there may be multiple process creation wrapper functions within function library 106. Similarly, thread creation wrapper function 110 may comprise multiple thread creation wrapper functions.

Process creation wrapper function 108 and thread creation wrapper function 110 may wrap a process creation or a thread creation function, respectively. The process and/or thread creation functions may be part of the glibc (GNU C Library) on the Linux operating system or libc (the standard c library), as non-limiting examples. Examples of function calls that process creation wrapper function and/or thread creation wrapper function 110 may wrap may include: pthread_create( ) clone( ), spawn( ), posix_spawn( ), execvp( ), execle( ), fork( ), vfork( ), and/or syscall( ) (with a reference to any of the aforementioned functions passed as an argument), as some non-limiting examples. Function library 106 may also wrap other process or thread creation functions not explicitly described herein.

In addition to causing functions library 106 to be preloaded, launcher application 102 causes computing system 100 to begin execution of launched application 104, which is specified to launcher application 102. Launched application 104 may be specified to launcher application 102 at run-time. In various examples, the file associated with launched application 104 may be specified to launcher application 102, e.g. using a command-line argument, text file, user input, or the like.

Whenever launched application 104 makes a call to process creation function 112, process creation wrapper function 108 of function library 106 intercepts the process creation call. Similarly, when launched application 104 makes a call to thread creation function 114, thread creation wrapper function 110 of function library 106 intercepts the thread creation call.

Responsive to intercepting calls to process creation function 112 or thread creation function 114, process creation wrapper function 108 or thread creation wrapper function 110 may create a process or thread on behalf of launched application 104, and may provide features to the newly-created threads or processes.

More particularly, by intercepting process creation and/or thread creation function calls, process creation wrapper function 108 and thread creation wrapper function 110 of launcher application 102 may execute various instructions that allow function library 106 to provide certain features to launched application 104. For example, process creation wrapper function 108 and thread creation wrapper function 110 may provide launch policies options to launched application 104 that specify which nodes processes and/or threads are assigned. Other examples of features provided to threads or processes of application 104 may include: logical CPU affinity, CPU assignment, IO affinity, kernel scheduling policy, memory allocation policies, and the like. Additional details of features provided at launch to threads and/or processes will be described in greater detail herein.

Responsive to intercepting process creation and/or thread creation function calls, process creation wrapper function 108 and thread creation wrapper function 110 may launch processes and/or threads. Launching processes and/or threads may comprise assigning or binding processes and/or threads to a particular node or core based on a launch policy. In some examples, launching a process or thread may comprise setting a binding or scheduling affinity of the process or thread such that the process or thread only executes on that node or core.

Thus, system 100 represents an example computing system to execute a user-space launcher application, wherein to execute the launcher application, the computing system to: wrap a process creation function with a process creation wrapper function, preload a function library comprising the process creation wrapper function, launch an application specified to the launcher application, intercept a call to the process creation function of the launched application with the process creation wrapper function, create a process on behalf of the application using the process creation function or the thread creation function, and provide features at launch to the process of the application based on a parameter specified to the launcher.

Some examples of features at launch that launcher application 102 may provide to launched application 104 may comprise launch policy options and launch policy types. Launch policy options indicate to which node (e.g., a CPU in a physical socket) processes and/or threads are assigned. Some examples launch policy options may include but are not limited to: no launch policy option, round-robin, fill-first, and packed launch policy options.

In a round-robin launch policy option, each time that launched application 104 attempts to create a process or thread, function library 106 assigns the process or thread to the next available node, set of cores, or CPU with multiple cores of computing system 100. In a fill-first launch policy option, each time a process or thread is created, function library 106 assigns the process or thread to a same node until each logical core within that node has a process or thread assigned. In a packed launch policy option, function library 106 assigns all child processes or sibling threads to the same node. If no launch policy option is selected, child processes or threads may be launched using any policy the operating system chooses.

In various examples, there may be different thread and process launch policy options. In general, when function library 106 creates a new process, the new process is governed by the parent of the new process's launch policy. Generally, a process begins executing a single thread, referred to as the "initial thread," or "main thread." The process thus begins execution as a "single-threaded process." However, when a process creates an additional thread, the specified thread launch policy options takes effect for the newly-created thread and any subsequently-created threads.

When launched application 104 spawns a thread, the main/initial thread typically already has been launched, i.e. created and assigned or bound to a particular core or node based on the process launch policy specified to launcher application 102. The binding does not change. In various examples, launching a process or thread may also comprise setting a scheduling affinity for the process or thread. The node to which an initial/main thread has been assigned is used as the starting node to implement the thread launch policies for all subsequent threads created by this process. Additionally, if no thread policy has been defined, created threads will inherit any launch policy from their parent (creating) thread. Also, if there is a process policy but no thread policy, function library 106 may assign all threads in a process to the same node in some examples.

Additionally, this disclosure defines launch policy types, which can be combined to round-robin and fill-first launch policy options. The launch policy options may be further affected by launch policy type, which may also be specified to launcher application 102. The launch policy types that may be specified to launcher application 102 may comprise "flat" and "tree" types. The launch policy types may define a group of processes or threads that share a common launch policy option. A group of processes or threads that share a common launch policy may be referred to as a policy group. Additionally, the launch policy options may affect whether function library 106 determines a node or core to assign a process or thread based on a previously-created thread or process within a policy group.

In a flat launch policy type, each process or thread forms a root of its own launch policy, i.e. a new launch policy group. A child thread or process created by the root is governed by the same launch policy as the root. However, if a child of the root creates an additional process (i.e. a child of a child), the $2^{nd}$ level child process acts as a new root, having its own launch policy. The flat launch policy distributes sibling processes or threads within a process according to the launch policy option.

In a tree launch policy type, all processes and/or threads created by a root process and any descendant processes, regardless of how deep the parent/child process tree is, are in the same launch tree. All of these processes are launched relative to one another in the order they are created according to the launch policy. Similarly, all threads are launched relative to one another in the order they are created according to the launch policy.

Different process policy types and thread policy types may be specified to launcher application 102. For example a tree-based process policy may be specified to launcher application 102, which causes function library 106 to distribute all processes among the nodes or cores of computing system 100. However, a user may also specify a flat thread policy type to launcher application 102 to assign threads within launched application 104 relative to each other.

In addition to launch policy options and launch policy types, launcher application 102 may provide additional features to launched application 104. For example, launcher application 102 may accept arguments that cause launcher application 102 to set a logical CPU affinity, a CPU assignment, IO affinity, a kernel scheduling priority, a memory allocation policy, a kernel scheduling policy and the like. Launcher application may receive indications of the aforementioned features as command-line arguments or in a similar manner as described above with respect to launch policy options and types.

In some examples, launcher application 102 may also provide a CPU policy option as a feature provided at launch to launched application 104. More particularly, launcher application 102 may receive an indication, such as a command-line argument that indicates a CPU on which processes should begin execution. In various examples, a process policy or a thread policy may be required when specifying a CPU policy option. Responsive to launcher application 102 executing launched application 104, process creation wrapper function 108 or thread creation wrapper function 110 selects an initial node on which to begin execution of processes and/or threads. Responsive to launched application 104 beginning execution, process creation wrapper function 108 and/or thread creation wrapper function 110 launches processes or threads on the indicated CPU within the selected node. Process creation wrapper function 108 and/or thread creation wrapper function 110 continues CPU selection for processes and/or threads in round-robin order within the selected node.

In various examples, to provide features at launch, such, IO affinity, CPU assignment, kernel scheduling priority, memory allocation policies, and the like, launcher application 102 may set environment variables. In some examples, process creation wrapper function 108 and thread creation wrapper function 110 may read the environment variables when intercepting calls to process creation function 112 or thread creation function 114 from launched application 104. Process creation wrapper function 108 and thread creation wrapper function 110 may pass various arguments or make additional system calls or standard library function calls when calling or after calling process creation function 112 or thread creation function 114. In some examples, function library 106 may provide features at launch, such as logical CPU affinity, to created processes and/or threads using the libnuma library or sched_setaffinity( ) system call. The libnuma library is a Linux library that offers an API (application programming interface) to NUMA policies and features supported by the Linux kernel. The sched_setaffinity( ) system call provides CPU affinity for a process or thread.

Additional details regarding the execution of launcher application 102 will now be discussed. To execute launcher application 102, a user, executable application, or script may issue a command-line operation. For example, launcher application 102 may be named "hplaunch." An example syntax for executing launcher application may be: "hplaunch [options] command [command arguments]." In this example, "command" represents launched application 104, and "[command arguments]" represent any arguments that launcher application 102 should pass to command. "[options]" may include arguments to launcher application 102 that specify a process launch policy, thread policy, CPU launch policy, log file, a list of nodes or CPUs to use for launching processes and threads, CPU assignment, logical CPU affinity, IO affinity, kernel scheduling priority, and/or memory utilization, as examples. The options may be passed to function library 106.

To pass the arguments from launcher application 102 to process creation function wrapper 108 and thread creation wrapper function 110, launcher application 102 may set values of operating system environment variables. Function library 106 may read the environment variables to determine the arguments passed to launcher application 102 in various examples. Once function library 106 has begun executing, function library 106 may create shared memory files, which store the arguments and/or options indicated to launcher application 102. In some examples, launcher application 102 and function library 106 may communicate arguments passed to launcher application to function library 106 using inter-process communication.

Responsive to executing launcher application 102, launcher application 102 may perform an initialization routine. The initialization routine may set an environment variable that causes function library 106 to be preloaded. In some examples, launcher application 102 may set the Linux LD_PRELOAD variable to the value of function library 106. Launcher application 102 may then execute launched application 104. Responsive to launcher application 102 executing and having set the LD_PRELOAD variable, function library 106 which may be invoked in launched application 104 by a dynamic loader before the c main( ) function executes. Similar to executing the initialization routine, launcher application 102 may execute an "exit( )" routine upon termination.

Whenever process creation wrapper function 108 or thread creation wrapper function 110 creates a thread or a process in launched application 104, the respective wrapper function may acquire an atomic lock to update various state data, such as the core to which the most recently-created process or thread is assigned, to update a number of processes or threads that have been executed. Responsive to updating the state data, process creation wrapper function 108 or thread creation wrapper function 110 may release the luck and cause the thread or process to begin execution.

Whenever a process or thread of launched application 104 terminates, function library 106 may intercept exit( ) and/or other process or thread termination functions, again using wrapper functions as described elsewhere. Function library 106 may detect through the intercepted the exit function calls that there are no more processes or threads associated with launched application 104. Responsive to determining that there are no more processes or threads associated with launched application 104, launcher application 102 may delete temporary shared memory files stored on the file system. The shared memory files may contain data common among threads or processes of launched application 104.

However, if a process or thread does not terminate gracefully, e.g. using the kill-9 command or another non-graceful termination mechanism, launcher application 102 may not detect that the shared memory files should be removed. To cope with the left over shared memory files, launcher application 102 may check for shared memory files that can be removed whenever launcher application 102 is started again. Additionally, launcher application 102 may maintain a maximum number of shared memory files, and deletes shared memory files if the number of shared memory files exceeds the maximum number. The shared memory files may not persist across reboots, i.e. launcher application 102 may delete the shared memory files upon reboot.

In some examples, the functions that create processes or threads, i.e. process creation function 112 and/or thread creation function 114 may return values that indicate the thread creation or process creation failed. In such cases, function library 106 may determine that a process or thread creation failure has occurred based on the return values. Function library 106 may then decrement a number of processes or threads launched, and may revert a variable indicating to which a node or core on which the process or thread was last assigned.

Figure 2:
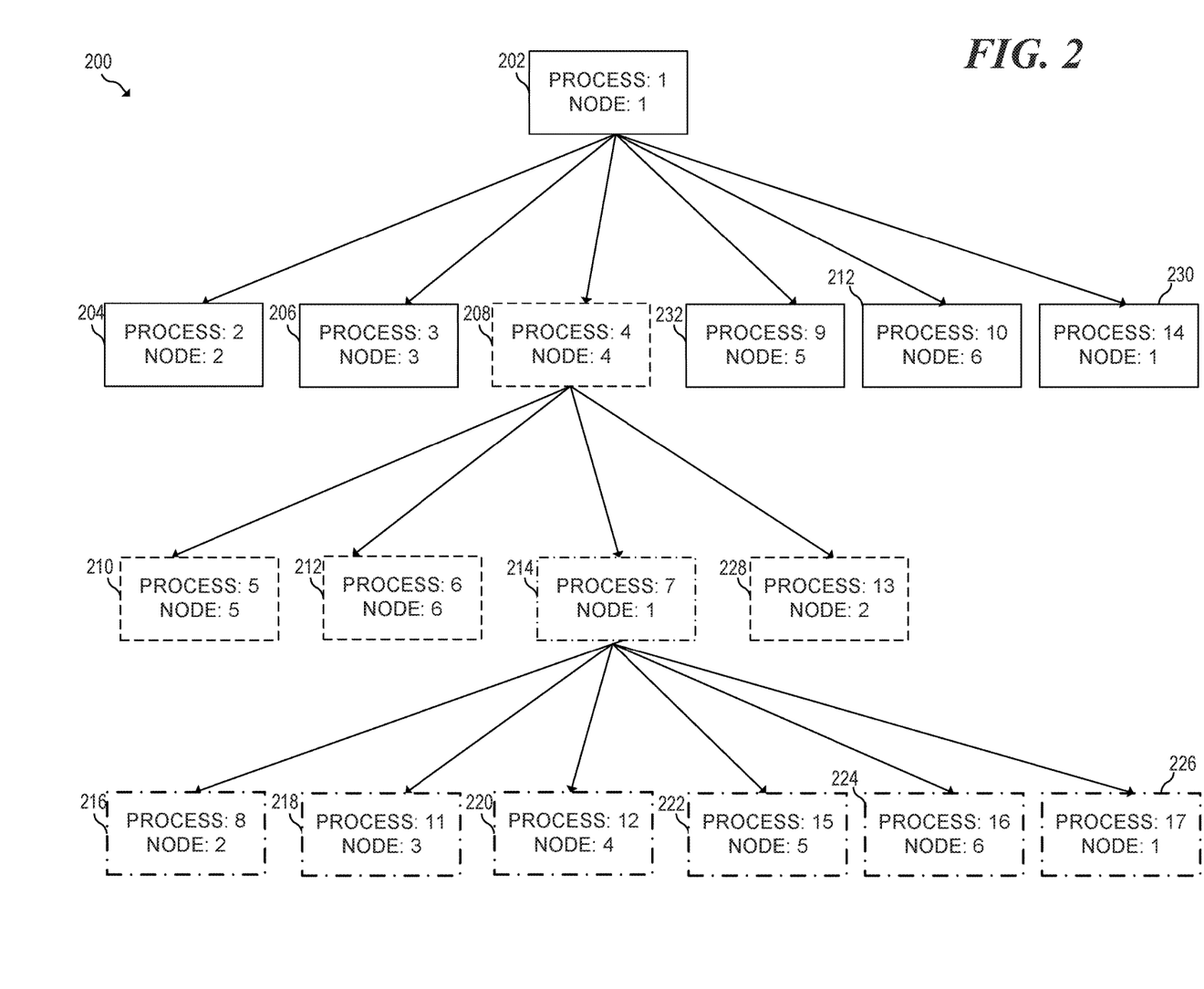
FIG. 2 is a conceptual diagram illustrating an example of a flat launch policy combined with a round-robin launch policy option.

FIG. 2 is a conceptual diagram illustrating an example of a flat launch policy combined with a round-robin launch policy option. FIG. 2 includes a system 200. System 200 comprises a tree of processes. Each block of system 200 represents a process created by an application launched using function library 106. Responsive to making a function call to create a process, function library 106 creates the requested process using process creation function 112, and assigns the process to a particular node (e.g., CPU or the like) of a computing system.

System 200 of FIG. 2 illustrates an example of a flat launch policy type combined with a round-robin launch policy option. System 200 illustrates a tree of processes as they are assigned to six different nodes. Six nodes are illustrated for the purpose of example. Any number of nodes may be present within the system illustrated in system 200. Additionally, any of the processes may comprise threads rather than processes.

In the example of system 200, a root process 202 is a first process (process 1), and is assigned to node number one. Process 202 spawns and launches process 204 (process 2) to node 2, and process 206 (process 3) to node 3. Process 202 also spawns process 208 (process four) and it is assigned to node 4.

Process 208 becomes the root of a new process tree and further spawns child process 210 (process 5), 212, 214 (process 6), and 216 (process 7). Processes 210, 212, and 214 are assigned to nodes 5, 6, and 1, respectively. Processes 210, 212 do not spawn any additional processes. Per the flat policy type, processes 208, 210, and 212 have the same policy type, and assign threads or processes in a round robin fashion within a root process tree.

Process 208 and its child processes, processes 210, 212, 214, and 228, have the same launch tree as process 208, as indicated by having a dashed border. That is, the order in which processes 208, 210, 212, 214, as well as process 228 (which is created later) are assigned to nodes is relative to each other rather than the node to which the most-recently created process was assigned.

Process 214 next spawns child process 216 (process 8). Function library 106 assigns process 216 to node 2 because the parent process in the policy group, process 214, was assigned to node 1. Subsequently, process 202 spawns process 232 (process 9). Launcher application assigns process 232 to node 5 because the previously-created process in that launch tree, process 208, was assigned to node 4. Similarly, process 202 spawns process 212 (process 10) and assigns process 212 to node 6 because process 232 was assigned to node 5.

Function library 106 then spawns processes 218 (process 11), and 220 (process 12). Function library 106 assigns processes 218, 220 to nodes 3 and 4, respectively. After process 220 (process 12) is created, process 208 (process 4) spawns process 228 (process 13). Function library 106 assigns process 228 to node 2 because the most recently-created process in that launch tree, process 214, was assigned to node 1.

After creating process 228, process 202 creates process 230 (process 14), and function library 106 assigns process 230 to node 1. Function library 106 assigns process 230 to node 1 because the most recently-created process in that launch tree, process 212, was previously assigned to node 6.

Next, process 214 creates processes 222 (process 15), 224 (process 16), and 226 (process 17). Because process 214 is the parent process, each of the processes are assigned using a round-robin policy to nodes based on the node to which the most-recently created process in the launch tree was assigned. For example, function library 106 assigns process 222 to node 5 because process 220 was assigned to node 4, and node 5 is the next node in the round-robin policy assignment sequence.

Additionally, it should be noted that processes 216, 218, 220, 222, 224, and 226 are in the same launch tree as process 214 because they are the children of process 214. Additionally, process 214 is the root of that policy tree. The launch tree of processes 214, 216, 218, 220, 222, 224 is illustrated by a dashed and dotted border.

Figure 3:
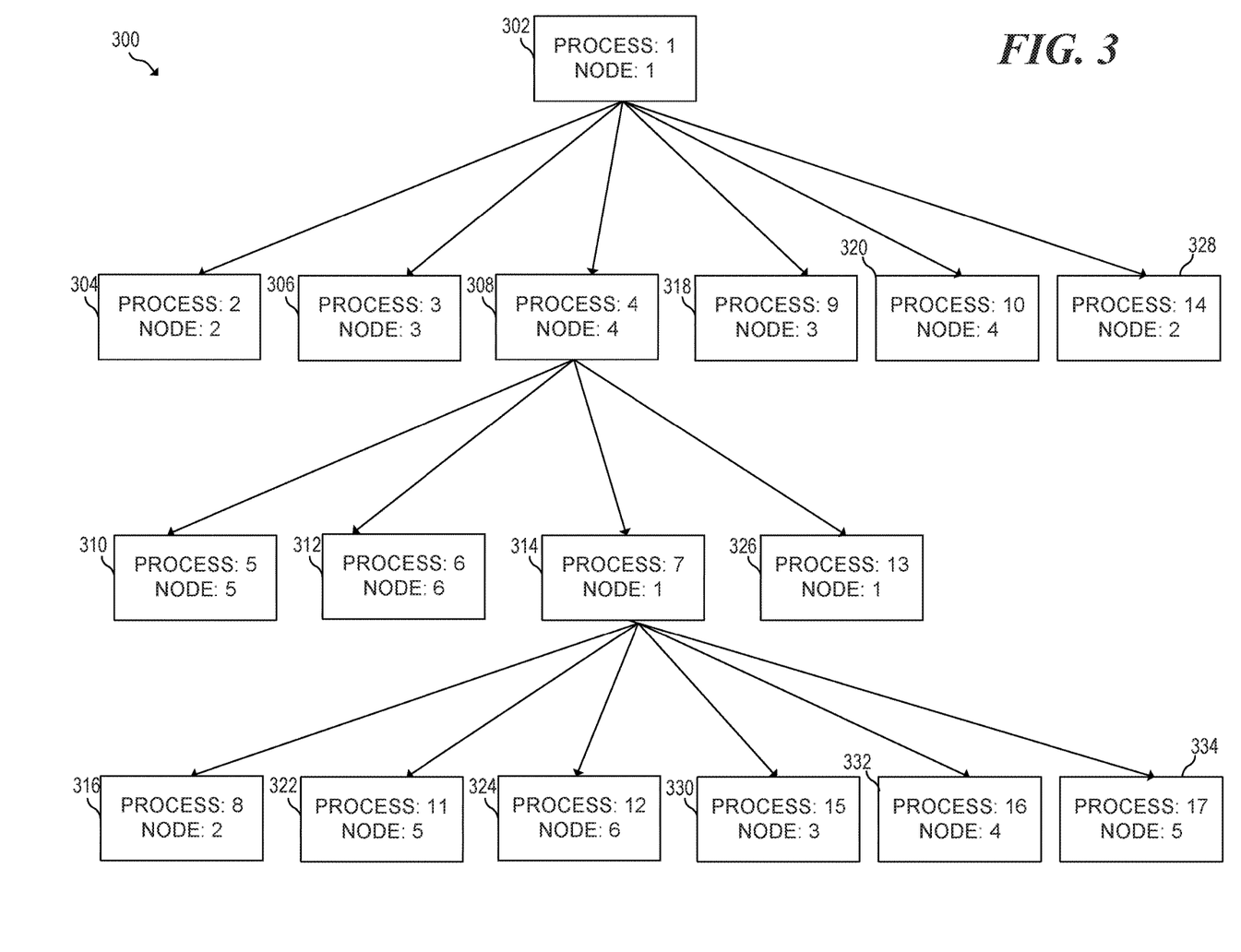
FIG. 3 is a conceptual diagram illustrating an example of a tree launch policy type combined with a round-robin launch policy option.

System 300 of FIG. 3 illustrates an example of a tree launch policy type combined with a round-robin launch policy option. As described above, the tree launch policy type causes function library 106 to all have the same launch policy type regardless of whether a process or thread spawns child processes or threads. The round robin policy type causes function library 106 to assign the processes to nodes in a sequential round robin order. Because system 300 has a single policy rather than multiple policies as in system 200 of FIG. 2, the processes of system 300 are uniformly assigned across all nodes and are assigned to nodes using a round-robin tree launch policy. Because processes are assigned using a tree policy, every descendant process illustrated in system 200 has the same policy as the root of its launch tree.

System 300 illustrates a tree of processes as they are assigned to six different nodes. Six nodes are illustrated for the purpose of example. Any number of nodes may be present within the system illustrated in system 300. Additionally, any of the processes may comprise threads rather than processes.

In the example of system 300, launched application 104 is a first process 302 (process 1), and function library 106 assigns process 302 to node one. Process 302 spawns and launches process 304 (process 2) to node 2, and process 306 (process 3) to node 3. Process 302 also spawns process 308 (process four) and function library 106 assigns it to node 4.

Process 308 further spawns child process 310 (process 5), 312, (process 6), and 314 (process 7), Function library 106 assigns processes 310, 312, 314, to nodes 5, 6, and 1, respectively. Process 314 spawns child process 316 (process 8), and launcher application assigns process 316 to node 2. Next, process 302 spawns process 318 (process 9). Function library 106 assigns it to node 3. Process 302 subsequently spawns process 320, and function library 106 assigns process 332 (process 10) to node 4.

After process 302 spawns process 320, process 314 spawns processes 322 (process 11), 324 (process 12). Function library 106 assigns processes 322, 324 to nodes 5 and 6, respectively. After process 324 has been created, process 308 spawns process 326 (process 13). Function library 106 assigns process 13 to node 1 because the previously-created process, process 322, was assigned to node 6. After creating process 326, process 302 creates process 328 (process 14), and function library 106 assigns process 328 to node 2. Function library 106 assigns process 328 to node 2 because previously-created process 326 was previously assigned to node 1.

Next, process 314 creates processes 330 (process 15), 332 (process 16), and 326 (process 17). Each of the processes are assigned to nodes based on the node to which the most recently-created process was assigned. For example, function library 106 assigns process 332 (process 16) to node 4 because process 330 (process 15) was assigned to node 3, and node 4 is the next node in the assignment sequence.

Figure 4:
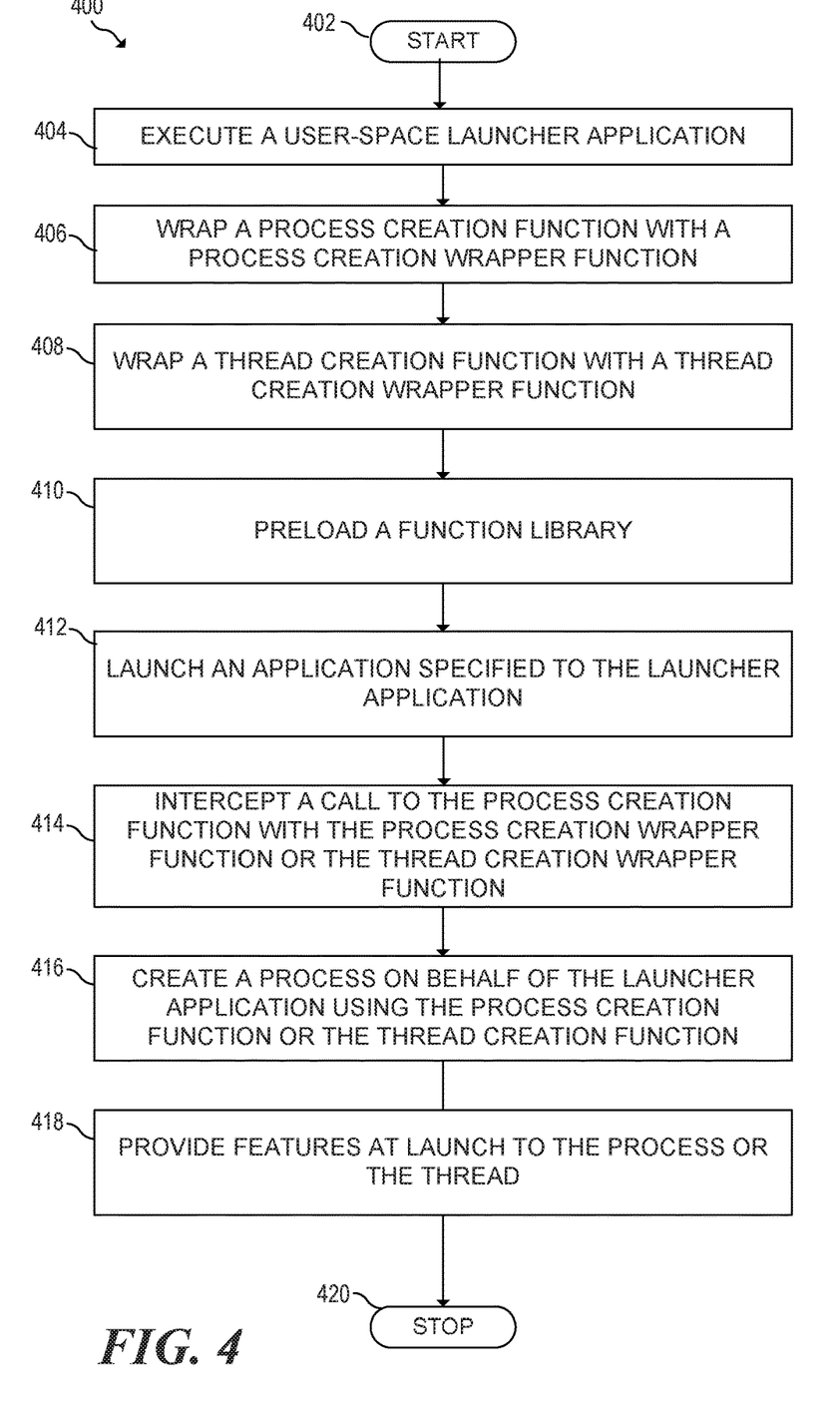
FIG. 4 is a flowchart of an example method for providing a feature at launch to an application.

FIG. 4 is a flowchart of an example method 400 for providing features at launch to processes and threads. Method 400 may be described below as being executed or performed by a system, for example, system 100 of FIG. 1. Other suitable systems and/or computing devices may be used as well. Method 400 may be implemented in the form of executable instructions stored on at least one machine-readable storage medium of the system and executed by at least one processor of the system.

Alternatively or in addition, method 400 may be implemented in the form of electronic circuitry (e.g., hardware). In alternate examples of the present disclosure, one or more blocks of method 400 may be executed substantially concurrently or in a different order than shown in FIG. 4. In alternate examples of the present disclosure, method 400 may include more or less blocks than are shown in FIG. 4. In some examples, one or more of the blocks of method 400 may, at certain times, be ongoing and/or may repeat.

Method 400 may start at block 402 and continue to block 404, where the system may execute a user-space launcher application. To execute the user-space launcher application (e.g. launcher application 102), system 400 may execute blocks 406-418. At block 406, the system may wrap a process creation function with a process creation wrapper function, e.g. process creation function 112. At block 408, the system may wrap a thread creation function with a thread creation wrapper function, e.g. thread creation function 114. At block 410, the system may preload a function library, e.g. function library 106.

At block 412, launcher application 102 may launch an application specified to the launcher application, e.g. launched application 104, and at block 414, the system may intercept a call to the process creation function or the thread creation function of the launched application with the process creation wrapper function or the thread creation wrapper function. At block 416, the system may create a process or thread on behalf of the launched application using the process creation function or the thread creation function, e.g. process creation function 112 or thread creation function 114. The method may proceed to block 418, where the system may provide a feature at launch to the process or thread of the launched application based on a parameter specified to the launcher.

In various examples, to provide features at launch, launcher application 102 may provide a policy that indicates at least one of a node or a logical processor core to which the process or thread is launched. In some examples, the policy may comprise at least one of: a round robin order, a fill-first order, or a packed order. In some examples, the policy may comprise at least one of: a flat launch policy or a tree launch policy. In various examples, to provide features at launch, launcher application 102 may provide at least one of a memory allocation policy, a logical central processing unit (CPU) affinity, a CPU assignment, an input-output affinity, or a kernel scheduling policy, to the created process or the thread to the created process or thread.

The method may then proceed to block 420, where the method may stop. In various examples, to provide features at launch to the process or thread, the system may provide a CPU launch policy to the process or thread of the launched application. To provide the CPU launch policy, the system may determine a node of the computing system to assign the process or thread, responsive to determining the node of the computing system to assign the process or tread, and assign the process or the thread to a core within the node. In some examples, to provide features at launch, the computing system may provide a thread launch policy to the thread and a thread launch policy to the thread, the thread launch policy and the process launch policy being different from each other.

In various examples, method 400 may include additional blocks that cause the system to determine a logical core of the computing system to assign the process or thread, attempting to assign the process or thread to the core, determine whether the process or thread launched successfully, mark the process or thread as launched responsive to launching the process or thread responsive to determining that the process or thread launched successfully, and undo the assignment of the process or the thread responsive to determining that the process or thread did not launch successfully.

Figure 5:
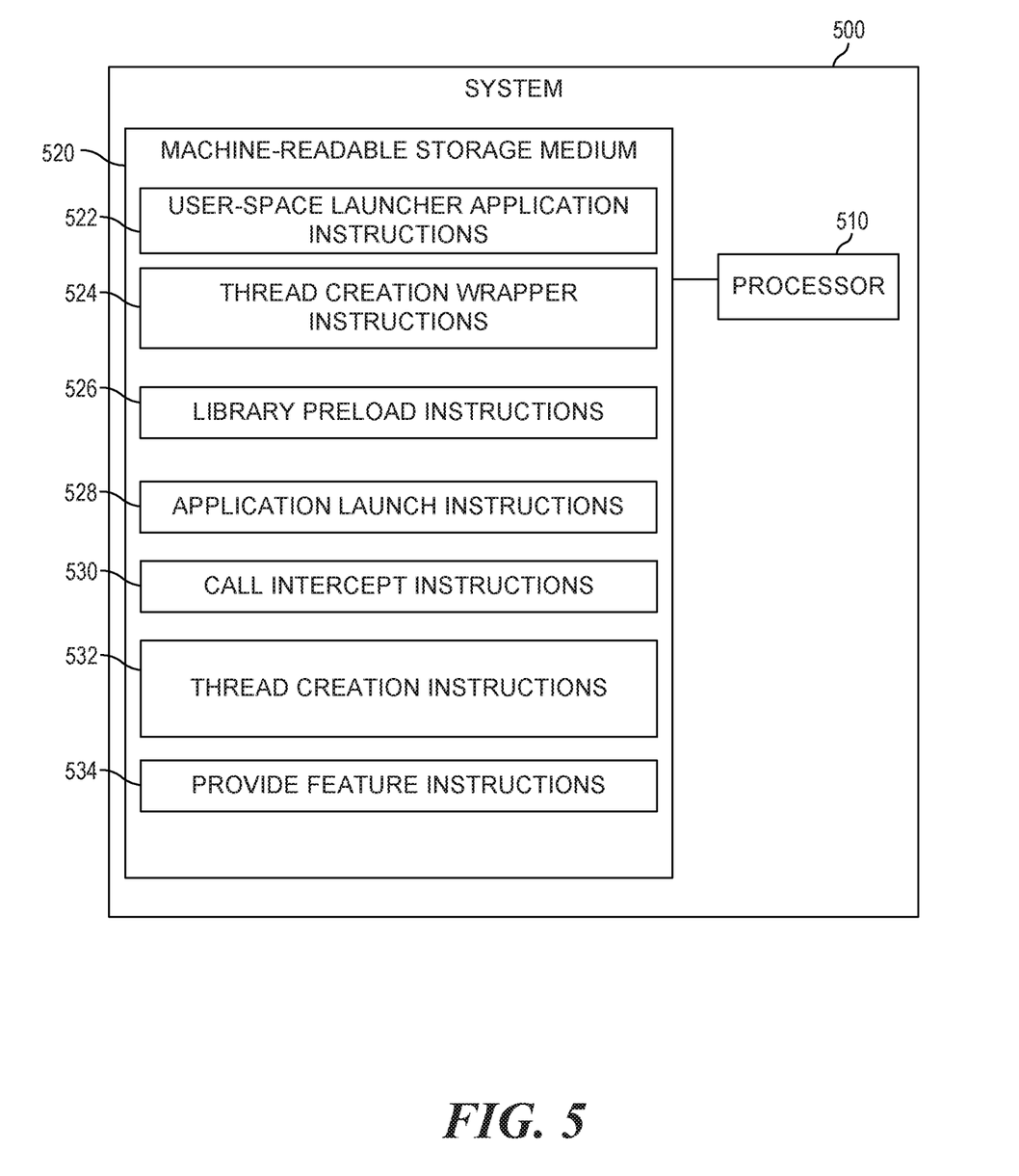
FIG. 5 is a block diagram of an example system for providing a feature at launch to an application.

FIG. 5 is a block diagram of an example system for providing features at launch to a thread or process. System 500 may be similar to system 100 of FIG. 1 or system 200 of FIG. 2, for example. In the example of FIG. 5, system 500 includes a processor 510 and a machine-readable storage medium 520. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 510 may be one or more central processing units (CPUs), microprocessors, and/or other hardware devices suitable for retrieval and execution of instructions stored in machine-readable storage medium 520. In the particular examples shown in FIG. 5, processor 510 may fetch, decode, and execute instructions 522, 524, 525, 528 to perform wear-leveling and failure remapping of a non-volatile memory. As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), non-volatile memory, a storage drive, an optical disc, and the like. Machine-readable storage medium 520 may be disposed within system 500, as shown in FIG. 5, In this situation, the executable instructions may be "installed" on the system 500.

Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for partial backup during runtime for memory modules with volatile memory and non-volatile memory.

Referring to FIG. 5, user-space launcher application instructions 522, when executed by a processor (e.g., 510), may cause system 500 to execute a user-space launcher application the instructions that cause the processor to execute the launcher application further cause the processor to perform instructions 524, 526, 528, 530, 532, and 534.

Thread creation wrapper instructions 524, when executed by a processor (e.g., 510), may cause system 500 to wrap a thread creation function with a thread creation wrapper function. Library preload instructions 526, when executed by a processor (e.g., 510), may cause system 500 to preload a function library comprising the thread creation wrapper function. Application launch instructions 528 may cause system 500 to launch an application specified to the launcher application.

Call intercept instructions 530, when executed by a processor (e.g., 510), may cause system 500 to intercept a call to the thread creation function of the launched application with the thread creation wrapper function. Thread creation instructions 532, when executed by a processor (e.g., 510) may cause system 500 to create a thread on behalf of the application using the process the thread creation function, and provide features instructions 534 may cause the processor to provide features at launch to the thread of the application based on a parameter specified to the launcher In various examples additional instructions may cause the processor (e.g., 510) to preload the function library using an LD_PRELOAD variable of an operating system. In some examples, the non-transitory machine-readable storage medium 500 of FIG. 5 may include instructions that cause the processor (e.g. 510) to intercept an exit function of the thread using a wrapper function for the exit function.

The invention claimed is:

1. A method for providing features at launch to an application of a computing system, the method comprising:
   executing a user-space launcher application, wherein executing the launcher application further comprises:
   wrapping a process creation function with a process creation wrapper function;
   wrapping a thread creation function with a thread creation wrapper function;
   preloading a function library comprising the process creation wrapper function and the thread creation wrapper function;
   launching an application specified to the launcher application to create a launched application;
   after the creation of the launched application, intercepting a call to the process creation function or the thread creation function of the launched application with the process creation wrapper function or the thread creation wrapper function;
   in response to the interception of the call, creating a process or thread on behalf of the launched application using the process creation function or the thread creation function; and
   at launch of the process or thread of the launched application, providing features to the process or thread of the launched application based on a parameter specified to the launcher.

2. The method of claim 1, wherein providing the features at launch further comprises providing a policy that indicates at least one of a node or a logical processor core to which the process or thread is launched.

3. The method of claim 2, wherein the policy comprises at least one of:
   a round robin order, a fill-first order, or a packed order.

4. The method of claim 2, wherein the policy comprises at least one of:
   a flat launch policy or a tree launch policy.

5. The method of claim 1, wherein providing the features at launch further comprises:
   providing at least one of: a memory allocation policy, a logical central processing unit (CPU) affinity, a CPU assignment, an input-output affinity, or a kernel scheduling policy, to the created process or the thread.

6. The method of claim 1, wherein providing the features at launch further comprises:
providing a thread launch policy to the thread and a process launch policy to the process, wherein the thread launch policy is different from the process launch policy.

7. The method of claim 1, wherein providing features at launch to the process further comprises:
providing a CPU launch policy to the process or the thread of the launched application.

8. The method of claim 7, wherein providing the CPU launch policy further comprises:
determining a node of the computing system to assign the process or thread; and
responsive to determining the node of the computing system to assign the process or tread,
assigning the process or the thread to a core within the node.

9. The method of claim 1, further comprising:
determining a node of the computing system to assign the process or thread;
launching the process or thread on the node;
determining whether the process or thread launched successfully;
marking the process or thread as launched responsive to launching the process or thread responsive to determining that the process or thread launched successfully; and
undoing the assignment of the process or the thread responsive to determining that the process or thread did not launch successfully.

10. The method of claim 1, wherein the user-space launcher application is executed in a virtual memory area of the computing system, wherein the virtual memory area is a separate from a kernel memory area of the computing system.

11. The method of claim 1, wherein:
the launched application is separate from the launcher application; and
launching the application specified to the launcher application comprises executing the launcher application to, at run-time of the launcher application, receive an input representing a file associated with the launched application and begin execution of the launched application.

12. A computing system for providing features at launch to an application, the system comprising:
a machine readable storage medium storing program instructions; and
a processor operably coupled to the machine readable storage medium, wherein the processor executes the program instructions to:
execute a user-space launcher application, wherein executing the user-space launcher application further comprises executing the program instructions to:
wrap a process creation function with a process creation wrapper function;
preload a function library comprising the process creation wrapper function;
launch an application specified to the launcher application to create a launched application;
after the creation of the launched application, intercept a call to the process creation function of the launched application with the process creation wrapper function;
in response to the interception of the call, create a process on behalf of the launched application using the process creation function or the thread creation function; and
at launch of the process of the launched application, provide a feature to the process of the launched application based on a parameter specified to the launcher.

13. The computing system of claim 12, wherein to preload the function library, the system further to:
preloading the function library using an environment variable.

14. The computing system of claim 12, wherein the computing system comprises a plurality of non-uniform memory architecture (NUMA) nodes, the system further to:
launch the processes on the nodes based on the parameter specified to the launcher,
wherein the parameter indicates a launch policy.

15. The computing system of claim 12, the system further to:
cause the processor to intercept an exit function of the process using a wrapper function for the exit function.

16. A non-transitory machine-readable storage medium encoded with instructions for providing features to an application at launch, the instructions executable by a processor of a system to cause the system to:
execute a user-space launcher application, the instructions that cause the processor to execute the launcher application further cause the processor to:
wrap a thread creation function with a thread creation wrapper function;
preload a function library comprising the thread creation wrapper function;
launch an application specified to the launcher application to create a launched application;
after the creation of the launched application, intercept a call to the thread creation function of the launched application with the thread creation wrapper function;
in response to the interception of the call, create a thread on behalf of the launched application using the thread creation function; and
at launch of the thread of the launched application, provide a feature to the thread of the launched application based on a parameter specified to the launcher.

17. The non-transitory machine-readable storage medium of claim 16, further comprising instructions that, when executed, cause the processor to preload the function library using an environment variable of an operating system.

18. The non-transitory machine-readable storage medium of claim 16, wherein instructions to provide the feature further comprises instructions to provide a policy that indicates at least one of a node or a logical processor core to which the process or thread is launched.

19. The non-transitory machine-readable storage medium of claim 16, wherein instructions to provide the feature further comprises providing at least one of: a memory allocation policy, a logical central processing unit (CPU) affinity, a CPU assignment, an input-output affinity, or a kernel scheduling policy, to the created process or thread.

20. The non-transitory machine-readable storage medium of claim 16, wherein instructions to provide the feature further comprises providing a thread launch policy to the thread and a process launch policy to the process, wherein the thread launch policy is different from the process launch policy.

21. The non-transitory machine-readable storage medium of claim 16, wherein instructions to provide the feature further comprises providing a CPU launch policy to the process or the thread of the launched application.

\* \* \* \* \*